(12) United States Patent  
Ioannides

(10) Patent No.: US 6,461,048 B1  
(45) Date of Patent: Oct. 8, 2002

(54) CAGE WITH IMPROVED GREASE RETENTION

(75) Inventor: Eustatios Ioannides, Zeist (NL)

(73) Assignee: SKF Engineering & Research Centre B.V., Dl Nieuwegein (NL)

( * ) Notice: Subject to any disclaimer, the term of this patent is extended or adjusted under 35 U.S.C. 154(b) by 0 days.

(21) Appl. No.: 09/582,501
(22) PCT Filed: Dec. 28, 1998
(86) PCT No.: PCT/NL98/00738
§ 371 (c)(1), (2), (4) Date: Jun. 27, 2000
(87) PCT Pub. No.: WO99/34124
PCT Pub. Date: Jul. 8, 1999

(30) Foreign Application Priority Data

Dec. 29, 1997 (NL) .............................................. 1007922

(51) Int. Cl.⁷ .............................................. F16C 33/46
(52) U.S. Cl. ........................................................ 384/470
(58) Field of Search ................................ 384/470, 580, 384/576, 572, 531

(56) References Cited

U.S. PATENT DOCUMENTS

| 2,950,151 A | 8/1960 | Clark et al. |
| 3,732,605 A | 5/1973 | Scheifele |
| 5,575,569 A | 11/1996 | Shinohara |

FOREIGN PATENT DOCUMENTS

| DE | 10 72 847 B | 1/1960 |
| DE | 33 22 860 A1 | 1/1984 |
| DE | 42 07 329 A1 | 10/1992 |
| FR | 1 281 693 A | 5/1962 |
| JP | A-61-140616 A | 6/1986 |

Primary Examiner—Lenard A. Footland
(74) Attorney, Agent, or Firm—Oliff & Berridge, PLC

(57) ABSTRACT

A cage for a rolling element bearing comprises at least one ring shaped body (1, 2) carrying regularly spaced cage bars (5), each pair of adjacent cage bars (5) defining a cage pocket (4) for accommodating a rolling element. At least one of the cage bars (5) comprises means (6, 7) for improved retention of grease thereon. The cage bar (5) comprises at least one space (8, 9) for accommodation of grease (10). Furthermore, the cage bar (5) comprises elements (6, 7) situated radially outside and/or inside, said element(s) defining at least one space (8, 9) for accommodation of grease (10).

12 Claims, 3 Drawing Sheets

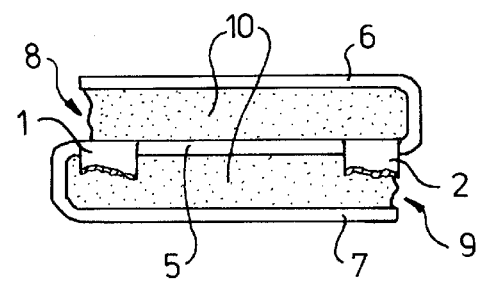
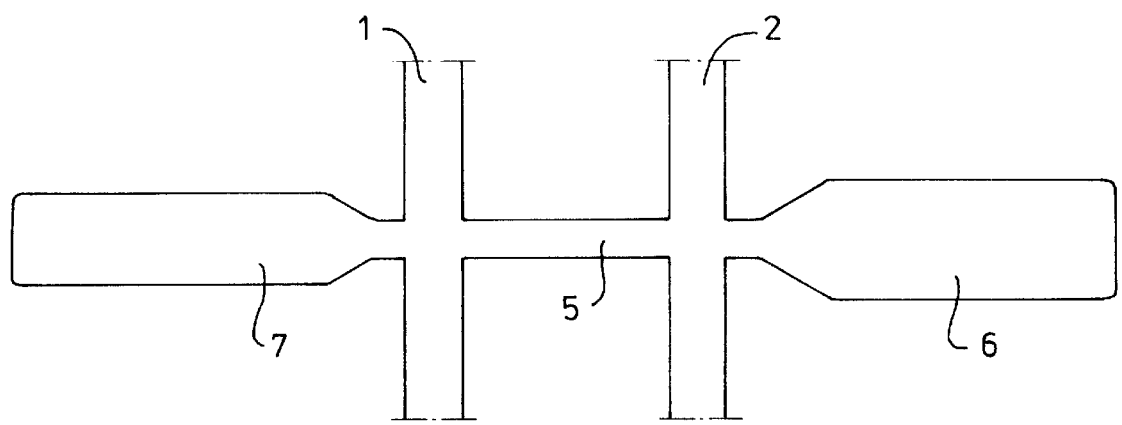

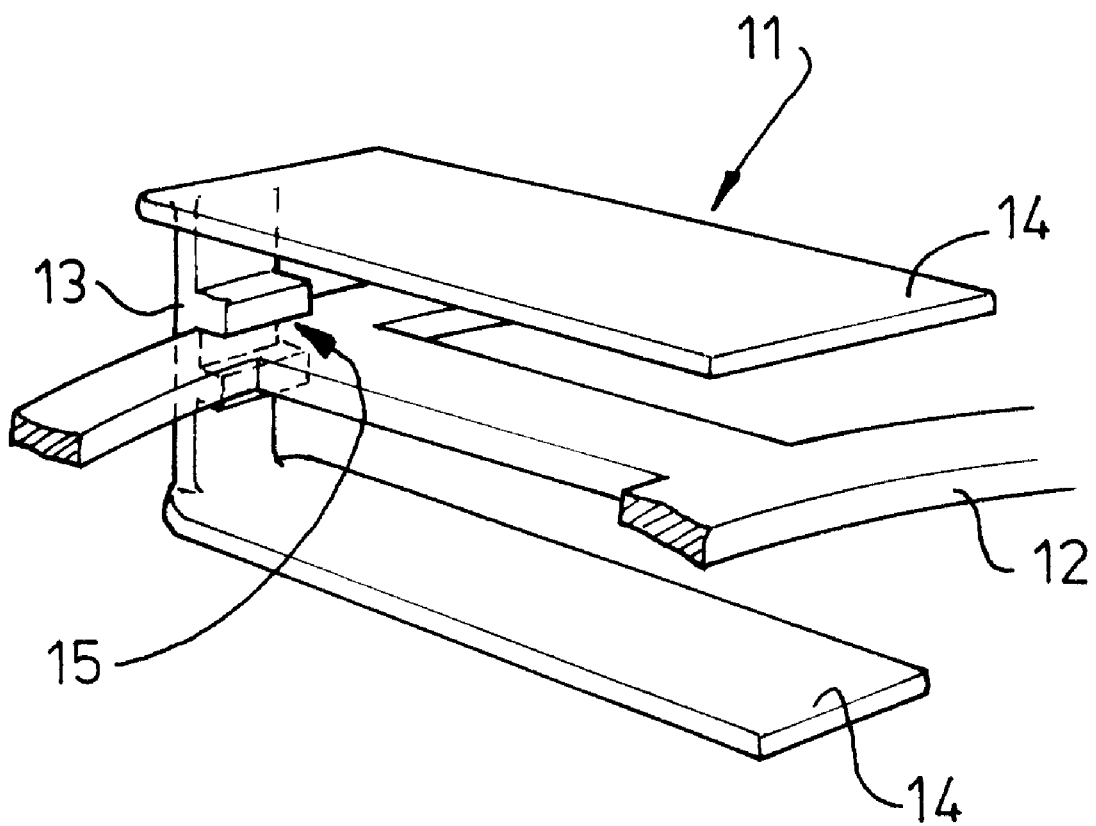

CAGE WITH IMPROVED GREASE RETENTION

The invention is related to a cage for a rolling element bearing, which cage comprises at least one ring shaped body carrying regularly spaced cage bars, each pair of adjacent cage bars defining a cage pocket for accommodating a rolling element.

Such cages are widely known. Their purpose is to maintain a constant, even spacing between the rolling elements.

Usually, rolling element bearings are supplied with an amount of grease for lubricating purposes. Ideally, the grease gradually releases its oil content, thus ensuring an extended lubrication of the bearing. In this respect, it is desirably to apply the grease as close as possible to the parts to be lubricated, e.g. the surface of the rolling elements. In particular, the amounts of grease which are collected on the cage bars are beneficial. These amounts are close to the rolling elements, thus enabling a direct supply of oil thereto.

Centrifugal forces, as occur in service, and limited adhesion however have a negative influence on the grease retention capacity of the cage. As a result, the grease on the cage bars may disappear, and collect in other areas where no supply towards the rolling elements or the raceways of the rings is possible.

The object of the invention is to provide a cage which allows a better lubrication of the bearing. This object is achieved in that least one of the cage bars comprises means for improved retention of grease thereon.

According to the invention, the cage allows more grease to attach itself on the cage bars. Thereby, a prolonged residence time of grease is obtained, as well as a more reliable lubrication of the bearing.

In the cage according to the invention, one or more cage bars may comprise at least one space for accommodation of grease; for instance a cage bar may comprise elements situated radially outside and/or inside, said element(s) defining at least one space for accommodation of grease.

The cage according to the invention may take several forms. According to a first possibility, the cage may consist of a metal, each cage bar being equipped with a protrusion defining a grease retention space. Each cage bar may comprise a bar which is bounded by the protrusions, one being situated radially outside said bar, the other being situated radially inside said bar. This may be a plastic ring shaped body attachable to the cage.

Furthermore, the cage may consist of a plastic material, each protrusion being molded in one part with a cage bar or an attachable ring shaped body.

The invention is also related to a rolling element bearing, comprising an inner ring, an outer ring, a series of rolling elements accommodated in the bearing space defined between the inner ring and the outer ring, and a cage, the cage bars comprising retention means for improved retention of grease thereon, which cage bars together with retention means occupy the available space between the rolling elements.

Subsequently, an example of a cage according to the invention will be described further with reference to an embodiment shown in the figures.

FIG. 3 shows a detail of the cage bars of the cage according to FIGS. 1 and 2.

FIG. 4 shows a part of a material strip for manufacturing the cage according to the invention.

FIG. 5 shows a further embodiment.

Figure 1:
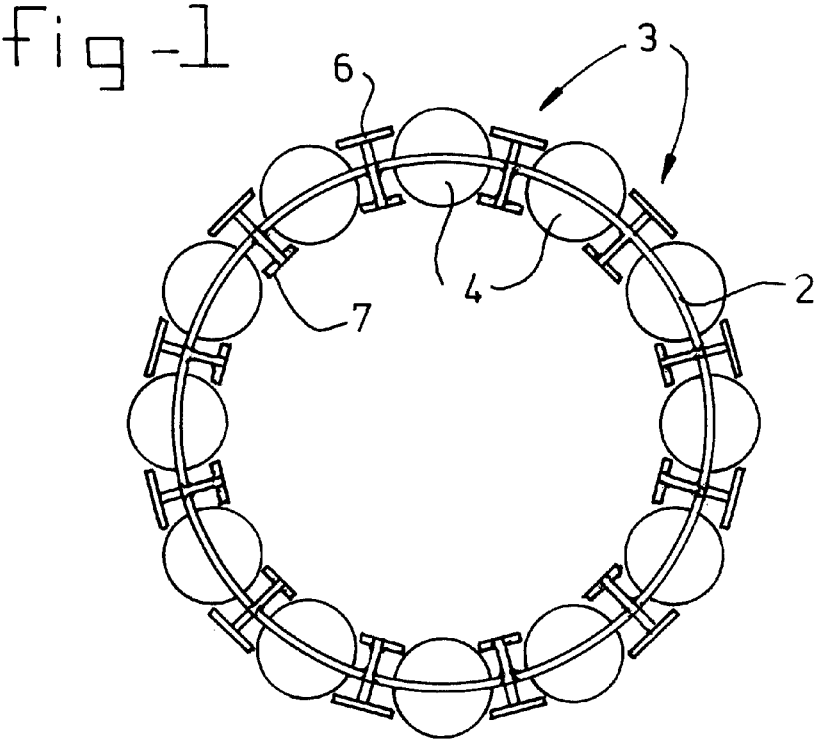
FIG. 1 shows a side view of a cage according to the invention.
Figure 2:
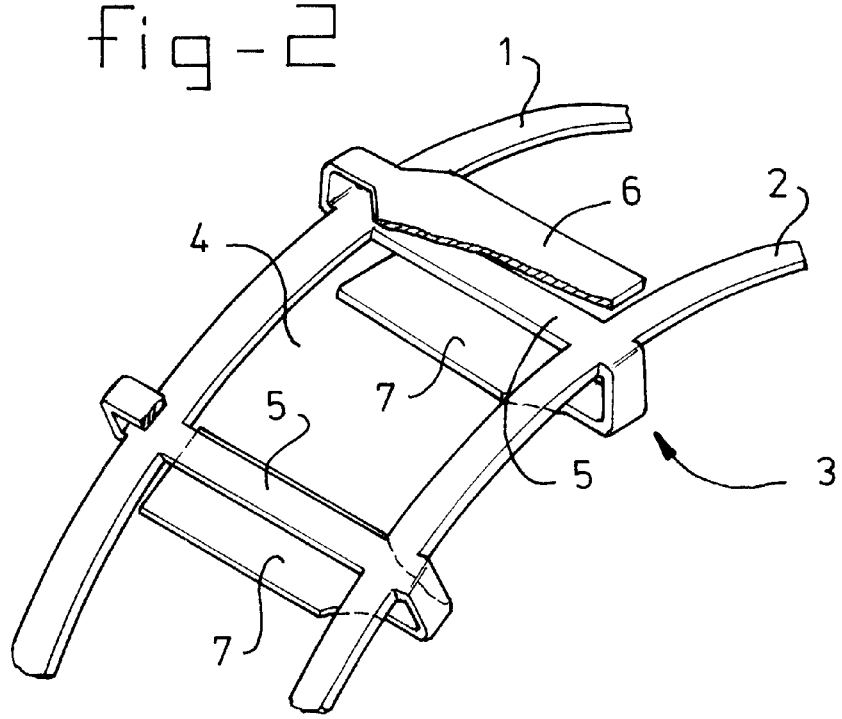
FIG. 2 shows the cage in perspective.

The cage as shown in FIG. 1 and 2 comprises two concentric rings 1, 2, between which cage bars, indicated by reference numeral 3, are connected. Each pair of cage bars 3 defines a cage pocket 4, for accommodating a rolling element (not shown).

Each cage bar 3 comprises first bar element 5, as well as secondary bar elements or protrusions 6, 7. Between these protrusions 5–7, spaces 8, 9 are formed, in which an amount of grease 10 can be accommodated.

Thus, each cage bar 3 is able to retain an appreciable amount of grease 10, close to the surface of the rolling elements contained between each pair of cage bars 3.

Also, the bars 5–7 are able to hold the grease also in case the cage is rotating rapidly. The grease may gradually release its all content directly onto the surface of the rolling elements in question, ensuring a proper lubrication.

The bar elements 5 have such a width in circumferential direction, that they almost extend up to the rolling elements in question. The length is about equal to the length of the cagebar.

FIG. 4 shows a part of a strip of material for manufacturing the cage according to the invention. The strip may be of metal, and can be obtained by carrying out a punching operation on a sheet of metal.

The bars 6, 7 are simply bended so as to bring them in a position above and below bar 5, for obtaining the pockets 8, 9.

Although in the FIGS. 1–4 one type of cage according to the invention is shown, also other embodiments are possible. For instance, in case the cage is molded from a plastic material, the pockets for increased grease retention may be molded in one piece with the cage bars.

A plastic or metallic snap-on body can be made. As shown in FIG. 5, a plastic or metallic body 11 can be snapped on cage bar 12. This body 11 comprises a bottom 13 and two flanges 14, between which the grease can be accommodated. Bottom 13 is connected to cage bar 12 by snap-fit means 15.

What is claimed is:

1. Cage for a rolling element bearing, which cage comprises at least one ring shaped body (1, 2) carrying regularly spaced cage bars (5, 3), each pair of adjacent cage bars (3) defining a cage pocket (4) for accommodating a rolling element, characterized in that at least one of the cage bars (3) comprises at least one grease retention element (6, 14) for improved retention of grease (10) thereon, said at least one grease retention element (6, 14) being provided at a distance, in radial direction, from the corresponding cage bar (5), and being of about the same length as the cage bar (5), a space (8, 9) for accommodation of grease being defined between said element (6, 14) and said cage bar (5).

2. Cage according to claim 1, wherein a cage bar (3) comprises at least one space (8, 9) for accommodation of grease.

3. Cage according to claim 1 wherein a cage bar (3) comprises elements (6, 7) situated radially outside and/or inside, said element(s) defining at least one space (8, 9) for accommodation of grease (10).

4. Cage according to claim 3, wherein the cage consists of a metal, each cage bar (3) being equipped with a protrusion (6, 7) defining a grease retention space (8, 9).

5. Cage according to claim 4, wherein each protrusion (6, 7) is connected to a ring shaped body (1, 2).

6. Cage according to claim 5, wherein a cage bar (3) comprises a bar (5) which is bounded by the protrusions (6, 7), one (6) being situated radially outside said bar (5), the other (7) being situated radially inside said bar (5).

7. Cage according to claim 3, wherein the cage consists of a plastic material, each protrusion being molded in one part with a cage bar or ring shaped body.

8. Cage according to claim 1 wherein a grease container body (11) is connected to at least one cage bar (12).

9. Cage according to claim 8, wherein the grease container body (11) comprises a bottom (13) and flanges (14) connected to said body, which bottom (13) and flanges (14) enclose a grease container space.

10. Cage according to claim 1, wherein the grease retention element is a bar-like or plate-like element (6, 14) which is parallel to the cage bar (5).

11. Cage according to claim 1, wherein the grease retention element, in circumferential direction, has a width which is essentially equal to the available spacing between the rolling elements.

12. Rolling element bearing, comprising an inner ring, an outer ring, a series of rolling elements accommodated in the bearing space defined between the inner ring and the outer ring, and a cage according to claim 1, the cage bars comprising retention means for improved retention of grease thereon, which cage bars together with retention means occupy the available space between the rolling elements.

* * * * *